(12) United States Patent
Xiong et al.

(10) Patent No.: US 11,206,693 B2
(45) Date of Patent: Dec. 21, 2021

(54) METHOD AND APPARATUS FOR TRANSMITTING AND RECEIVING A SIGNAL IN A WIRELESS COMMUNICATION SYSTEM

(71) Applicant: Samsung Electronics Co., Ltd., Suwon-si (KR)

(72) Inventors: Qi Xiong, Beijing (CN); Chen Qian, Beijing (CN); Bin Yu, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 92 days.

(21) Appl. No.: 16/740,116

(22) Filed: Jan. 10, 2020

(65) Prior Publication Data

US 2020/0229242 A1 Jul. 16, 2020

(30) Foreign Application Priority Data

Jan. 10, 2019 (CN) .......................... 201910026220.4

(51) Int. Cl.
*H04W 74/08* (2009.01)
*H04W 74/00* (2009.01)

(52) U.S. Cl.
CPC ..... *H04W 74/0833* (2013.01); *H04W 74/008* (2013.01)

(58) Field of Classification Search
CPC ............. H04W 74/006; H04W 74/008; H04W 74/0833
See application file for complete search history.

(56) References Cited

U.S. PATENT DOCUMENTS

| 11,076,432 | B2 * | 7/2021 | Islam | H04W 74/085 |
| 11,089,632 | B2 * | 8/2021 | Pan | H04W 76/27 |
| 2017/0006499 | A1 | 1/2017 | Hampel et al. | |
| 2018/0092139 | A1 * | 3/2018 | Novlan | H04W 56/001 |
| 2020/0145967 | A1 * | 5/2020 | Park | H04W 72/0426 |
| 2020/0196225 | A1 * | 6/2020 | Wang | H04W 48/16 |
| 2021/0195675 | A1 * | 6/2021 | Park | H04W 88/14 |
| 2021/0251011 | A1 * | 8/2021 | You | H04W 16/24 |

OTHER PUBLICATIONS

Intel Corporation, "PHY layer enhancements for NR IAB", 3GPP TSG RAN WG1 #95, Nov. 12-16, 2018, R1-1812486, 13 pages.
InterDigital Inc., "On Integrated Access and Backhaul Enhancements in NR", 3GPP TSG RAN WG1 Meeting #95, Nov. 12-16, 2018, R1-1813225, 6 pages.

(Continued)

*Primary Examiner* — Liton Miah

(57) ABSTRACT

A method for transmitting a signal in a wireless communication system. The method includes receiving, from a base station, random access configuration information of a normal UE. The method also includes determining random access configuration information of an integrated Access and Backhaul (IAB) UE from the received random access configuration information of the normal UE based on information indicating relationship between the random access configuration information of the normal UE and the random access configuration information of the IAB UE. The method further includes transmitting, to the base station, a preamble using the determined random access configuration information of the IAB UE.

10 Claims, 9 Drawing Sheets

(56) References Cited

OTHER PUBLICATIONS

Qualcomm Incorporated, "Enhancements to support NR backhaul links", 3GPP TSG RAN WG1 Meeting #95, Nov. 12-16, 2018, R1-1813417, 19 pages.
Samsung, "Necessary Enhancements for NR IAB", 3GPP TSG RAN WG1 Meeting #95, Nov. 12-16, 2018, R1-1812981, 9 pages.
Notification of Transmittal of the International Search Report and the Written Opinion of the International Searching Authority, or the Declaration dated Apr. 22, 2020 in connection with International Patent Application No. PCT/KR2020/000426, 10 pages.

* cited by examiner

METHOD AND APPARATUS FOR TRANSMITTING AND RECEIVING A SIGNAL IN A WIRELESS COMMUNICATION SYSTEM

CROSS-REFERENCE TO RELATED APPLICATION

The application is based on and claims priority under 35. U.S.C. 119 to Chinese Application Number 201910026220.4 filed on Jan. 10, 2019, the disclosure of which is herein incorporated by reference in its entirety.

1. FIELD

The disclosure relates to the field of a radio communication system, and more specifically relates to a method and apparatus for transmitting and receiving a signal in a wireless communication system.

2. DESCRIPTION OF RELATED ART

To meet the soaring demand with respect to wireless data traffic due to the commercialization of a $4^{th}$ generation (4G) system and the increase of multimedia services, an improved 5G communication system or a pre-5G communication system is being developed. This is one reason why '5G communication systems' or 'pre-5G communication systems' are called 'beyond 4G network communication systems' or 'post Long-Term Evolution (LTE) systems.'

In order to increase a data transmission rate, 5G communication systems are being developed to be implemented in a super-high frequency band (millimeter wave (mmWave)), e.g., a band of 60 GHz. In order to reduce the path loss of radio waves in such a super-high frequency band and to increase a transmission distance of radio waves, various technologies for 5G communication systems are being discussed and studied, for example: beamforming, massive multiple-input multiple-output (MIMO), Full Dimensional MIMO (FD-MIMO), array antennas, analog beam-forming, and large-scale antennas.

Also, in order to improve system network performance for 5G communication systems, various technologies have been developed, e.g.: evolved small cells, advanced small cells, cloud radio access networks (Cloud-RAN), ultra-dense networks, Device-to-Device communication (D2D), wireless backhaul, moving networks, cooperative communication, Coordinated Multi-Points (CoMP), and interference cancellation. Also, for 5G communication systems, other technologies have been developed, e.g., hybrid frequency-shift keying (FSK) and quadrature amplitude modulation (QAM) (FQAM) and Sliding Window Superposition Coding (SWSC), which are Advanced Coding Modulation (ACM) schemes, and Filter Bank Multi Carrier (FBMC), non-orthogonal multiple access (NOMA), and sparse code multiple access (SCMA), which are advanced access schemes.

The Internet has evolved from a human-based connection network, where humans create and consume information, to the Internet of Things (IoT), where distributed configurations, such as objects, exchange information with each other to process the information. Internet of Everything (IoE) technology is emerging, in which technology related to the IoT is combined with, for example, technology for processing big data through connection with a cloud server. In order to implement the IoT, various technological components are required, such as sensing technology, wired/wireless communication and network infrastructures, service interface technology, security technology, etc. In recent years, technologies including a sensor network for connecting objects, Machine to Machine (M2M) communication, Machine Type Communication (MTC), etc. have been studied. In the IoT environment, intelligent Internet Technology (IT) services may be provided to collect and analyze data obtained from objects connected to each other to create new value in human life. As existing information technology (IT) techniques and various industries converge and combine with each other, the IoT may be applied to various fields, such as smart homes, smart buildings, smart cities, smart cars or connected cars, smart grids, health care, smart home appliances, high quality medical services, etc.

Various attempts are being made to apply 5G communication systems to the IoT network. For example, technologies related to sensor networks, M2M communication, MTC, etc., are being implemented by using 5G communication technology including beam-forming, MIMO, array antennas, etc. The application of Cloud-RAN as a big data processing technology described above may be an example of convergence of 5G communication technology and IoT technology.

Transmissions in a radio communication system include: a transmission (called a downlink transmission) from a base station (gNB) to a user equipment (UE), of which a corresponding slot is called a downlink slot; and a transmission (called an uplink transmission) from the UE to the base station, of which a corresponding slot is called an uplink slot.

In the downlink communication of the radio communication system, the system periodically transmits a synchronization signal and a broadcast channel to a UE by a synchronization signal block (SSB, a synchronization signal/physical broadcast channel (PBCH) block), and the transmission period is a synchronization signal block periodicity (SSB periodicity) or called a synchronization signal block burst periodicity (SSB burst periodicity). Meanwhile, the base station may configure a random access configuration period (a physical random access channel configuration period, PRACH configuration period), within which a certain number of random access transmission occasions (also called random access occasions, PRACH transmission occasions, ROs), and it is satisfied that all of SSBs may be mapped onto the corresponding ROs within a mapping period (a certain duration).

In a new radio (NR) communication system, the performance of random access directly affects the user's experience before a radio resource control is established, such as in the random access process. In a conventional radio communication system, such as LTE and LTE-Advanced, the random access process is applicable to a variety of scenarios, such as initial connection establishment, cell handover, uplink reestablishment, and RRC connection reestablishment, and is divided into Contention-based Random Access and Contention-free Random Access according to the determination of whether a UE monopolizes preamble sequence resources. In the Contention-based Random Access, since each of the UEs selects a preamble sequence from the same preamble sequence resources in the process of attempting to establish an uplink, the same preamble sequence may be selected by a plurality of UEs to be transmitted to the base station. Therefore, a contention resolution mechanism is an important research direction in the random access. How to reduce the contention probability and quickly resolve the contention that has already occurred are crucial for the performance of the random access.

The Contention-based Random Access in LTE-A includes four steps, as shown in FIG. 1. In the first step, the UE randomly selects a preamble sequence from a preamble sequence resource pool and transmits the preamble sequence to the base station. The base station performs correlation detection on the received signal so as to identify the preamble sequence transmitted by the UE. In the second step, the base station transmits, to the UE, a Random Access Response (RAR), which includes a random access preamble sequence Identifier, a timing advance command determined according to the delay estimation between the UE and the base station, a temporary Cell-radio Network Temporary Identifier (C-RNTI), and time-frequency resources allocated for the next uplink transmission of the UE. In the third step, the UE transmits a third message (Msg3) to the base station according to the information in the RAR. The Msg3 contains information, such as a user terminal identifier and a Radio Resource Control (RRC) connection request, wherein the user terminal identifier is unique to the UE and is used to resolve the contention. In the fourth step, the base station transmits, to the UE, a contention resolution identifier, which includes the user terminal identifier that has won the contention resolution. The UE upgrades the temporary C-RNTI to a C-RNTI after detecting its identifier, and transmits an ACK signal to the base station. Then the random access process is completed, and the UE waits for the scheduling by the base station. Otherwise, the UE will start a new random access process after a period of time.

For the Contention-free Random Access process, since the UE identifier is known to the base station, a preamble sequence may be allocated to the UE. Therefore, the UE does not need to randomly select the preamble sequence, but uses the allocated preamble sequence, when transmitting the preamble sequence. Upon detecting the allocated preamble, the base station transmits a corresponding Random Access Response, containing information such as timing advance and uplink resource allocation. Upon receiving the Random Access Response, the UE considers that the uplink synchronization has been completed and waits for a further scheduling by the base station. Therefore, the Contention-free Random Access process only includes two steps: the first step of transmitting a preamble sequence; and the second step of transmitting a Random Access Response.

The random access process in LTE is applicable to scenarios of: 1. initial access in the RRC_IDLE state; 2. RRC connection reestablishment; 3. cell handover; 4. downlink data arriving and requesting for a random access process in the RRC connected state (when the uplink is in a non-synchronous state); 5. a scenario where, uplink data arriving and requesting for a random access process in the RRC connected state (when the uplink is in a non-synchronous state, or there is no resource in the PUCCH resources allocated for the scheduling request); and 6. positioning.

However, in some communication systems, such as a communication system in which an Integrated Access and Backhaul (IAB) is taken into account, when an IAB mobile terminal, i.e., an IAB UE, attempts to access a donor base station (donor BS) of the IAB by the random access, the IAB UE may not located in the range served by the IAB base station. Therefore, new methods for configuring resources for IAB random access and performing the IAB random access transmission are needed.

SUMMARY

Provided are an apparatus and method for transmitting and receiving a signal in a wireless communication system.

Additional aspects will be set forth in part in the description which follows and, in part, will be apparent from the description, or may be learned by practice of the presented embodiments of the disclosure.

According to an embodiment of the disclosure, a method for transmitting an uplink signal, includes: obtaining random access configuration information and downlink signal configuration information, wherein the random access configuration information includes random access configuration information for a normal UE and random access configuration information for an IAB UE; determining preamble resources and random access time-frequency resources for the IAB UE according to the random access configuration information and the downlink signal configuration information; and transmitting preambles in the preamble resources for the IAB UE on the random access time-frequency resources.

In the embodiment, the random access configuration information for the IAB UE may include a first timing advance value, and said transmitting the preamble in the preamble resources for the IAB UE on the random access time-frequency resources includes: transmitting the preamble in the preamble resources for the IAB UE at a temporal position before the first timing advance value of the random access time-frequency resources.

In the embodiment, if the time-frequency resources for the IAB UE and the random access time-frequency resources for the normal UE are shared, the random access configuration information of the normal UE is reused by the random access configuration information for the IAB UE so as to implement at least one of partial time domain sharing, partial frequency domain sharing, and partial time-frequency domain sharing; and/or a start of indices of and a number of the preamble resources for the IAB UE are determined based on the random access configuration information for the normal UE.

In the embodiment, if the time-frequency resources for the IAB UE and the random access time-frequency resources for the normal UE are not shared, said determining the preamble resources and the random access time-frequency resources for the IAB UE according to the random access configuration information and the downlink signal configuration information may include at least one of:

determining the preamble resources and the random access time-frequency resources for the IAB UE according to the random access configuration information for the IAB UE and the downlink signal configuration information;

determining the random access time-frequency resources for the IAB UE according to the random access time-frequency resource information for the normal UE, the downlink signal configuration information, and configuration information for a relative relationship of the random access time-frequency resources for the IAB UE relative to the random access time-frequency resources for the normal UE; and determining a preamble format based on at least partly reused random access configuration information for the normal UE and/or the downlink signal configuration information.

In the embodiment, the method may further include: in a case where the preamble is to be transmitted by the IAB UE in a primary network, a primary secondary network, or a secondary network, transmitting the preamble in the preamble resources for the IAB UE at the temporal position before the first timing advance value of the random access time-frequency resources.

In the embodiment, the first timing advance value may be at least one of: a maximum timing advance value indicated by a timing advance command, a cell-specific timing advance value configured by a network device, and a UE-specific timing advance value configured by the network device.

In the embodiment, the method may further include: receiving random access feedback from a network device, wherein the random access feedback indicates a second timing advance value; and determining a timing advance value for a subsequent uplink transmission based on the first timing advance value and the second timing advance value.

In the embodiment, the random access configuration information may include at least one of: a random access configuration period, time unit indices of random access occasions, frequency domain unit indices of the random access occasions, a number of the random access occasions, a random access preamble format, a number of random access preambles, an index of a root sequence, a cyclic shift value, and a number of synchronization signal blocks that can be mapped onto one random access occasion.

In the embodiment, the downlink signal configuration information may include at least one of: a downlink signal period, a number of downlink signals transmitted within one downlink signal period, indices of the downlink signals transmitted within one downlink signal period, time unit positions of the downlink signals transmitted within one downlink signal period, and frequency domain unit positions of the downlink signals transmitted within one downlink signal period.

According to another embodiment of the disclosure, a UE includes a processor and a memory, wherein the memory stores instructions which, when executed by the processor, cause the processor to perform the method according to the first aspect of the disclosure.

According to another embodiment of the disclosure, a computer readable medium having stored thereon computer executable instructions, which, when executed, implement the method according to the embodiment of the present disclosure.

The disclosure provides a method and a device for transmitting an uplink signal. In the random access process, the UE may obtain the resource configuration information for the random access by receiving the configuration information (for example, from the base station or the system configuration), determine the random access resources (for example, the random access occasions) based on the configuration information, and transmit the preamble, with the method provided by the disclosure. In addition, the UE obtains the timing advance command from the random access feedback received thereafter, so that it may update the timing advance value for the subsequent uplink transmission based on the timing advance command.

According to another embodiment of the disclosure, A method of operating a user equipment (UE) in a wireless communication system is provided, the method includes: receiving, from a base station, random access configuration information of a normal UE; determining random access configuration information of an integrated Access and Backhaul (IAB) UE from the received random access configuration information of the normal UE based on information indicating relationship between the random access configuration information of the normal UE and the random access configuration information of the IAB UE; and transmitting, to the base station, a preamble using the determined random access configuration information of the IAB UE.

According to another embodiment of the disclosure, a user equipment (UE) in a wireless communication system is provided, the UE includes: a transceiver; and at least one processor configured to: receive, from a base station, random access configuration information of a normal UE, determine random access configuration information of an integrated Access and Backhaul (IAB) UE from the received random access configuration information of the normal UE based on information indicating relationship between the random access configuration information of the normal UE and the random access configuration information of the IAB UE, and transmit, to the base station, a preamble using the determined random access configuration information of the IAB UE.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

The above and other objects, features and advantages of the disclosure will become more apparent from the following description of embodiments of the disclosure, taken in conjunction with the accompanying drawings, in which.

DETAILED DESCRIPTION

Figure 1:
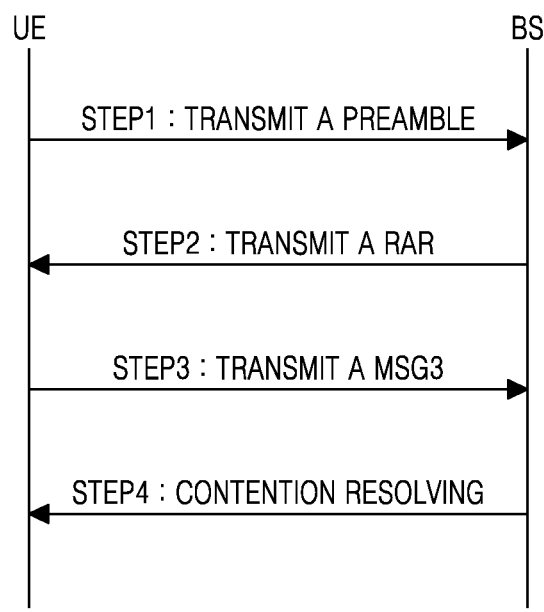
FIG. 1 illustrates a sequence diagram of a four-step contention based random access process in the prior art.

FIGS. 1 through 9, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Hereinafter, embodiments of the disclosure will be described with reference to the accompany drawings. It should be understood, however, that the description is only illustrative, and is not intended to limit the scope of the disclosure. In addition, the description of well-known structures and techniques are omitted in the following specification in order to avoid unnecessarily obscuring the concept of the disclosure.

It is to be understood by those skilled in the art that singular forms "a", "an", "the" and "said" used herein may also include plural forms unless otherwise indicated. It is to be further understood that the phrase "include/comprise" used in the specification indicates the presence of the said feature, integer, step, operation, element, and/or component, but does not exclude the presence or addition of one or more other features, integers, steps, operations, elements, and/or components. It is to be understood that when an element is referred to as being "connected" or "coupled" to other element, it may be directly connected or coupled to the other element or there may be an intermediate element therebetween. Further, the phrase "connection" or "coupling" as used herein may include a wireless connection or a wireless coupling. The phrase "and/or" as used herein may include all or any of the one or more associated terms listed and all combinations thereof.

Those skilled in the art will appreciate that all the terms (including technical and scientific terms) used herein have the same meaning as that is commonly understood by those skilled in the art to which the invention belongs, unless otherwise defined. It should also be understood that terms such as those defined in a general dictionary should be understood to have the meaning being in consistent with the meaning in the context of the prior art, and will not be explained as idealized or excessively formal meaning, unless specifically defined as herein.

Those skilled in the art may understand that the phrases "terminal" and "terminal device" as used herein include not only a radio signal receiver device, which is a device only having a radio signal receiver without a transmitting capability, but also a device with receiving and transmitting hardware, which is a device having receiving and transmitting hardware capable of performing a bidirectional communication over a bidirectional communication link. Such a device may include: a cellular or other communication device having a single line display or a multi-line display or a cellular or other communication device without a multi-line display; a Personal Communication Service (PCS), which may combine voice, data processing, fax and/or data communication capabilities; a Personal Digital Assistant (PDA), which may include a Radio Frequency (RF) receiver, a pager, Internet/Intranet access, a web browser, a notepad, a calendar, and/or a Global Positioning System (GPS) receiver; a conventional laptop and/or palmtop computer or other device, which may be a conventional laptop and/or palmtop computer or other device having and/or including an RF receiver. The "terminal" and "terminal device" as used herein may be portable, transportable, installed in a vehicle (of aviation, maritime, and/or land), or may be adapted and/or configured to operate locally, and/or may operate in a distributed form on the earth and/or at any other locations in space. The "terminal" and "terminal device" used herein may also be a communication terminal, an Internet terminal, a music/video playing terminal, such as a PDA, a Mobile Internet Device (MID), and/or a mobile phone having a music/video playback function, or a smart TV, a set-top box and other devices.

The disclosure relates to a method for transmitting an uplink signal, a user equipment, and a computer readable medium.

A time domain unit (also called a time unit) in the disclosure may be: an OFDM symbol, an OFDM symbol group (consisting of a plurality of OFDM symbols), a time slot, a time slot group (consisting of a plurality of time slots), a subframe, a subframe group (consisting of a plurality of subframes), a system frame, a system frame group (consisting of a plurality of system frames); or may be an absolute time unit, such as 1 ms, 1 s, etc. The time unit may also be a combination of various granularities, such as N1 time slots plus N2 OFDM symbols.

A frequency domain unit in the disclosure may be: a subcarrier, a subcarrier group (consisting of a plurality of subcarriers), a Resource Block (RB), which may also be referred to as a Physical Resource Block (PRB), a resource block group (consisting of a plurality of RBs), a BandWidth Part (BWP), a BandWidth Part group (consisting of a plurality of BWPs), a band/carrier, a band group/carrier group; or may be an absolute frequency domain unit, such as 1 Hz, 1 kHz, etc. The frequency domain unit may also be a combination of various granularities, such as M1 PRBs plus M2 subcarriers.

In order to make the objects, technical means and advantages of the disclosure clear, the disclosure will be further described in detail below with reference to the accompanying drawings.

In the embodiments of the disclosure, an IAB UE may obtain the configuration information of the network from the network side via the system information or a RRC configuration message or a downlink control channel. The obtained configuration information contains at least one of: random access information for a normal UE, random access configuration information for an IAB UE, a timing advance value TA_IAB_rach, downlink signal (for example, SSB or CSI-RS) configuration information. It should be noted that the normal UE here may be a rel-15 UE.

According to the embodiments of the disclosure, the random access configuration information for the normal UE may include a random access configuration index. For example, the random access configuration index indicates at least one of:
- a random access configuration period;
- a duration (for example, 10 ms) of the random access resources in the random access configuration period and a location of the duration in the random access configuration period (for example, if the random access configuration period is equal to 40 ms, the location N indicates that the configured random access resources are located at the (N+1)-th 10 ms of 40 ms. As an example, N=0 indicates the random access resources configured at the first 10 ms of 40 ms);
- time unit indices of the random access resources (such as, slot indices, symbol indices, subframe indices, etc.);
- the number of random access occasions;
- a start time unit index of random access occasions (such as, a slot index, a symbol index, a subframe index, etc.);
- the number of time units occupied by one random access occasion;
- a random access preamble format (such as, a cyclic prefix (CP) length, a preamble sequence length and the number of repetitions, a guard period (GP) length, the size of a subcarrier used, etc.).

In addition, the random access configuration information for the normal UE may further include: a frequency domain unit index of a random access occasion (such as, a carrier index, a BWP index, a PRB index, a subcarrier index, etc.), the number of random access preambles, and a root sequence index, a cyclic shift value, the number of SSBs that may be mapped onto one random access occasion, one or more CSI-RS indices for random access (signal state information reference signal(s)), and the number of ROs onto which one CSI-RS is mapped, index(es) of one or more ROs onto which one CSI-RS is mapped, and so on.

According to embodiments of the disclosure, the random access configuration information for the IAB UE may include one or more of the following configuration information, which may be divided into two cases of sharing time-frequency resources and not sharing time-frequency resources for discussion.

Sharing Time-Frequency Resources

If the random access time-frequency resources for IAB are shared with the random access time-frequency resources for the normal UE, for example, when it is predefined on the network side (by default) or indicated to the UE through a system information (SI), Downlink Control Information (DCI), Radio Resource Control (RRC) message that the random access time-frequency resources for IAB are shared with the random access time-frequency resources for the normal UE, (1) for the configuration of the random access time-frequency resources for IAB, the configuration of the random access time-frequency resource for the normal UE may be reused. That is, according to the start position of the random access time-frequency resources for the normal UE configured on the network side, and/or the number of random access time-frequency resources for the normal UE, and/or the random access time-frequency resource period for the normal UE, and/or the mapping relationship between the random access time-frequency resources for the normal UE and downlink signals (SSBs and/or CSI-RSs), etc., the UE may find available random access time-frequency resources for IAB. Specifically, the random access time-frequency resources for IAB are partly shared with the random access time-frequency resources for the normal UE by at least one of:
- partial time domain sharing, in which the network configures the start position in time domain and/or the number of the random access time-frequency resources for IAB on the random access time-frequency resources for the normal UE; and the UE obtains the random access time-frequency resources for IAB by receiving the configuration information, wherein the configuration information may indicate the index of the start RO and/or the number of ROs directly with N bits, or indicate, by way of a relative relationship, for example, that the ROs started from the X-th RO are the random access time-frequency resources for IAB;
- partial frequency domain sharing, in which the network configures the start position in frequency domain and/or the number of the random access time-frequency resources for IAB on the random access time-frequency resources for the normal UE; and the UE obtains the random access time-frequency resources for IAB by receiving the configuration information, wherein the configuration information may indicate the index of the start RO and/or the number of ROs directly with N bits, or indicate, by way of a relative relationship, for example, that the ROs started from the Y-th RO are the random access time-frequency resources for IAB;
- partial time-frequency domain sharing, in which the network configures the start positions in both time domain and frequency domain and/or the number of the random access time-frequency resources for IAB on the random access time-frequency resources for the normal UE; and the UE obtains the random access time-frequency resources for IAB by receiving the configuration information, wherein the configuration information may indicate the index of the start RO and/or the number of ROs directly with N bits, or indicate, by way of a relative relationship, for example, that the ROs started from the X/Y-th RO are the random access time-frequency resources for IAB;

(2) for the configuration of the random access preamble resources for IAB, the UE needs to determine the start of the indices of the available random access preambles for IAB, and the number of available random access preambles for IAB.

In order to determine the start of the indices of the available random access preambles for IAB, one of the following methods may be used, in which
- the UE makes the determination based on the default (preset) start position of the preamble indices. For example, it is preset that all the indices of the available random access preambles for IAB start from the random access preamble index 0, or are the same as the indices of the determined random access preambles for the normal UE;
- the UE makes the determination based on the start position of the indices of the preambles configured on the network side, such as PreambleForIABRACHStart;
- the UE calculates the start of the indices of the available random access preambles for IAB by using the start of the indices of the random access preambles for the normal UE. If the start of the indices of the random access preambles for the normal UE determined by the UE is denoted as PreambleForRACHStart (for example, for a selected SSB index, the start of the preambles to which it is mapped is determined), and the number of indices of available random access preambles for the normal UE is X (for example, for a selected SSB index, the number of preambles to which it is mapped is determined), PreambleForIABRACHStart=PreambleForRACHStart+X. In particular, the network configuration information may directly indicate N random access preambles for the normal UE as the random access preambles for IAB, and the N preambles may be predefined as the N preambles having the smallest (largest) index values among those of the random access preambles for the normal UE.

In order to determine the number of available random access preambles for IAB, one of the following methods may be used, in which the UE makes the determination based on the default (preset) number of preambles, e.g., the number of available preambles preset by the system is N, or is the same with the number of random access preambles for the normal UE by default;

the UE makes the determination based on the number of preambles configured on the network side, such as numberOfPreambleForIABRACH; in particular, the number may be specified as the number of preambles within Group A, such as a numberOfRA-PreamblesForIABRAGroupA, which is an integer within the range from 1 to 64, wherein when the size of the data in Message A of the UE is less than (not greater than) a preset or configured threshold S1, and/or the downlink PL (and/or RSRP) measured by the UE is less than (not greater than) a preset or configured threshold value S2, the UE selects preambles from Group A; when the size of the data in Message A of the UE is not less than (greater than) the preset or configured threshold value S1, and/or the downlink PL (and/or RSRP) measured by the UE is not less than (greater than) the preset or configured threshold S2, the UE selects preambles from Group B; in this case, the number of preambles in Group B is equal to the number of all the available preambles minus the number of available preambles in Group A; and the start position of the preambles in Group B may be obtained by adding the start position of Group A to the number of available preambles in Group A; in particular, the network configuration information may directly indicate N random access preambles for the normal UE as the random access preambles for IAB, and the N preambles may be predefined as the N preambles having the smallest (largest) index values among those of the random access preambles (all, or in Group A, or in Group B) for the normal UE;

the UE calculates the number of available random access preambles for IAB by using the number of random access preambles for the normal UE. If the start of the indices of the random access preambles for the normal UE determined by the UE is denoted as numberOfRA-PreamblesForRACH (for example, for a selected SSB index, the number of preambles to which it is mapped is determined), the determination may be made based on a preset or configured relative relationship, such as a multiple relationship BETA (i.e., numberOfRA-PreamblesForIABRACH=numberOfRA-PreamblesForRACH*BETA), or a difference relationship D (i.e., numberOfRA-PreamblesForIABRACH=numberOfRA-PreamblesForRACH+D); In particular, the method of determining the preambles may be separately applied to the determination of the number of preambles within Group A or B.

Not Sharing Time-Frequency Resources

When the random access time-frequency resources for IAB are not shared with the random access time-frequency resources for the normal UE, for example, when it is predefined on the network side (by default) or indicated to the UE through the SI, DCI, RRC message that the random access time-frequency resources for IAB are not shared with the random access time-frequency resources for the normal UE, that is, the UE is separately indicated on the random access time-frequency resources for IAB, the method for the UE determining the configuration of the random access time-frequency resources for IAB may be the UE being indicated separately, or may be indicating relative relationship (in time and/or frequency domain) configuration information relative to the random access time-frequency resources for the normal UE to the UE.

For the case of a completely separate indication, for example, the UE obtains the configuration of the random access time-frequency resources for IAB by reading information indicated by IAB RACH-ConfigCommon. The indicated information includes at least one of:

the number of SSBs on each RO and/or the number of preambles corresponding to each SSB, i.e., ssb-perRACH-OccasionAndCB-PreamblesPerSSB;

a random access configuration index, i.e., prach-ConfigurationIndex, indicating the configuration of the random access time-frequency resources for IAB in the time dimension, and including: a random access configuration period for IAB (that is, the configured random access time-frequency resources for LAB occur periodically on a certain of time unit(s)); a duration occupied in each period (for example, 10 ms) and the location of the duration X_IAB (for example, the period is 40 ms, the duration 10 ms of the random access time-frequency resources is the X_IAB-th 10 ms within 40 ms, for example, X_IAB=2, a system frame number SFN mod(4)=X_IAB=2, indicating that a RACH frame is located at the second 10 ms); the number and location of ROs configured in the duration;

the number of ROs in the frequency domain on the same time unit;

the start position of the ROs in the frequency domain.

In addition, for the case of indicating the relative relationship (in time and/or frequency domain) configuration information relative to the random access time-frequency resources for the normal UE, the UE obtains the configuration information of the random access time-frequency resources for IAB from the configuration information of the random access time-frequency resources for the normal UE and the relative relationship (in time and/or frequency domain) configuration information relative to the random access time-frequency resources for the normal UE. The relative relationship (in time and/or frequency domain) configuration information relative to the random access time-frequency resources for the normal UE includes at least one of a time domain relative location information indication and a frequency domain relative location information indication.

According to embodiments of the disclosure, the time domain relative position information indication includes at least one of:

- a relative relationship beta of the random access configuration period for IAB (IABRACH_period) relative to the random access configuration period for the normal UE (RACH_period), that is, IABRACH_period=beta*RACH_period; for example, if RACH_period=20 ms, and beta=2, IABRACH_period is 40 ms; in particular, the relative relationship beta may also be preset by the system;
- an offset, X_delta time units, of the location X_IAB of the duration (for example, 10 ms, referring to a random access frame (RACH frame)) of the random access time-frequency resources for IAB occupied in each random access configuration period relative to the location X of the duration (for example, 10 ms) of the random access time-frequency resources for the normal UE, that is, X_IAB=X_+X_delta. If the duration of the random access time-frequency resources for the normal UE is located at the first 10 ms in the random access configuration period, i.e., X_delta=1, the duration of the random access time-frequency resources for IAB is located at the second 10 ms subsequent to the first 10 ms in the random access configuration period, and the number and the location of ROs of the random access time-frequency resources for the IAB within the duration occupied are the same as the number and the location of ROs of the random access time-frequency resources for the normal UE in the duration occupied;
- the number and/or the location and/or the period in time domain of random access time-frequency resources for IAB predefined or configured by the network to be the same as the number and/or the location and/or the period in time domain of the random access time-frequency resources for the normal UE.

According to embodiments of the disclosure, the frequency domain relative location information indication includes at least one of: (if the start position of the first RO in the frequency domain on the same time unit for the random access resources for the normal UE is FDMed_RO_start and/or the number of ROs in the frequency domain on the same time unit is N_FDMed_RO):

- an interval between the start position of the first RO in the frequency domain for the random access time-frequency resources for IAB (for example, the first subcarrier on the RO) and the end position of the last RO in the frequency domain for the random access time-frequency resources for the normal UE (for example, the last subcarrier on the RO), that is, N frequency domain units;
- the number of ROs in the frequency domain for the random access time-frequency resources for IAB, which may be indicated by N bits directly, or an indication of the predefined reused number of ROs in the frequency domain of the random access time-frequency resources for the normal UE (i.e., the same as the number of ROs in the frequency domain for the random access time-frequency resources for the normal UE), or a configured relative relationship relative to the number of ROs in the frequency domain for the random access time-frequency resources for the normal UE (for example, a ratio).

An IAB random access preamble format in a case of not sharing time-frequency resources will be described below with reference to FIGS. 2-6.

Figure 2:
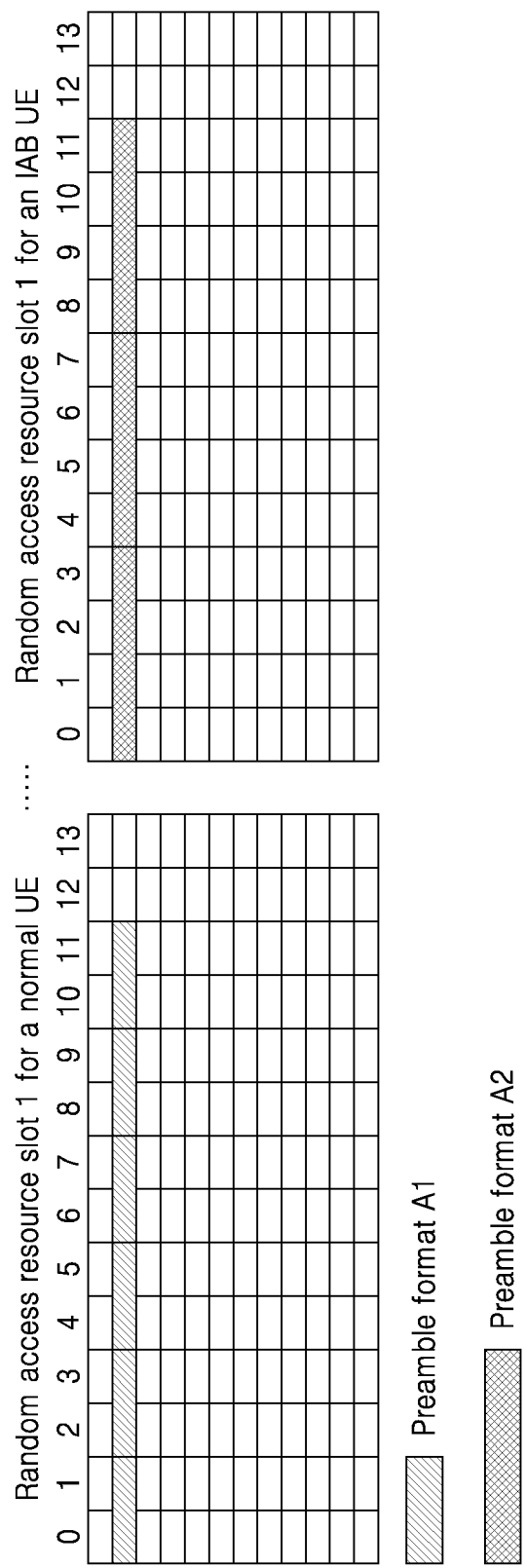
FIG. 2 illustrates an example in which an integrated Access and Backhaul (IAB) UE employs a different short preamble format according to an embodiment of the disclosure.

FIG. 2 illustrates an example in which an integrated Access and Backhaul (IAB) UE employs a different short preamble format according to an embodiment of the disclosure. If the random access preamble format indicated by the random access configuration index in the random access configuration information of the normal UE is a short sequence format (such as, a preamble sequence with a length of 139), and the IAB random access preamble format is also a short preamble format but different from the random access preamble format of the normal UE (for example, the number of time units occupied by one random access occasion is different), for the random access resources for IAB, the IAB UE may reuse at least one of: the time unit indices of the random access resources, and the start time unit index of the random access occasions.

Moreover, the number of IAB random access occasions needs to be recalculated according to the number of time units occupied by the configured IAB random access preamble format. For example, if the random access preamble format indicated by the random access configuration index in the random access configuration information of the normal UE is A1, the time unit indices of the random access resources are Slots 1, 4, 7 (such as, a random access configuration index 104), the random access occasion start time unit index is the 0-th OFDM symbol, one random access occasion occupies 2 OFDM symbols, and there are 6 random access occasions in one slot, then for the IAB random access configuration, the IAB preamble format is configured as A2, and then a random access occasion occupies 4 OFDM symbols, the IAB UE reuses the time unit indices of the random access resource and the start time unit index of the random access occasions, and calculates Number of IAB Random Access Occasions Per Slot=Number of Random Access Occasions for Normal UE*Number of OFDM Symbols Occupied by Preambles of Normal UE ÷Number of OFDM Symbols Occupied by Preambles for IAB UE, that is, 6*2÷4=3 in the example as shown in FIG. 2, in which Slot 1 is taken as an example.

Figure 3:
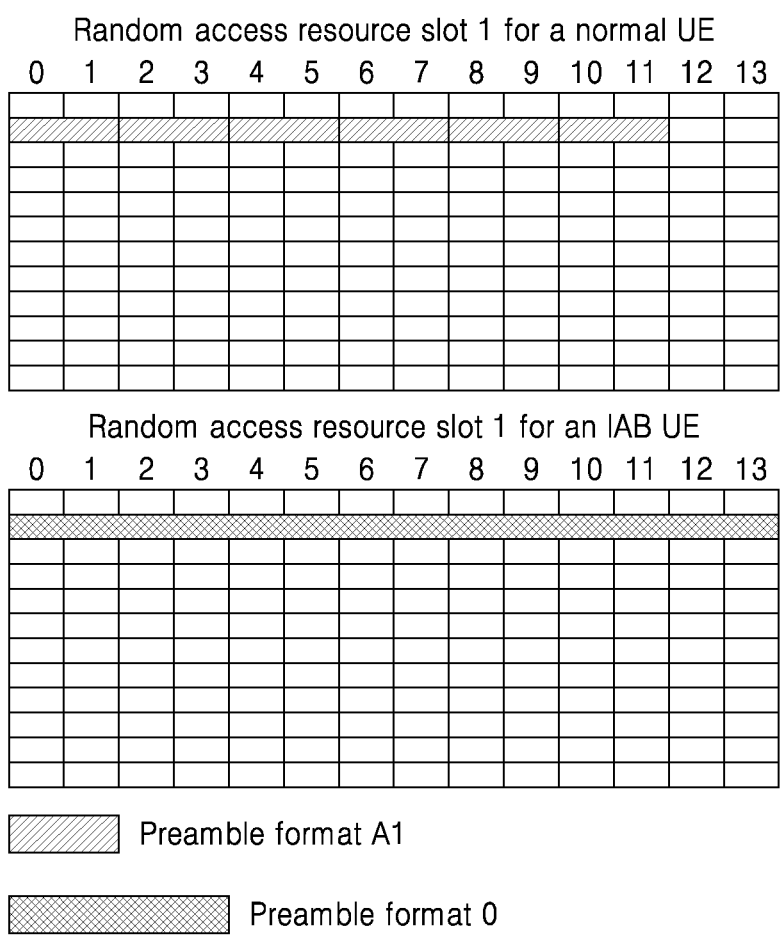
FIG. 3 illustrates an example in which an IAB UE employs a different longer preamble format according to an embodiment of the disclosure.

FIG. 3 illustrates an example in which an IAB UE employs a different longer preamble format according to an embodiment of the disclosure. If the random access preamble format indicated by the random access configuration index in the random access configuration information of the normal UE is a short preamble format (such as, a preamble sequence with a length of 139), while the IAB random access preamble format is a longer sequence format (such as, a preamble sequence with a length of 839), for the random access resources for IAB, the IAB UE may reuse at least the time unit indices of the random access resources.

Moreover, the random access occasion start time unit index is determined according to the predefined start position or the start position of the longer sequence preamble format by default. For example, if the random access preamble format indicated by the random access configuration index in the random access configuration information of the normal UE is A1, the time unit indices of the random access resource are Slots 1, 4, 7 (such as, a random access configuration index 104), the random access occasion start time unit index is the 0-th OFDM symbol, one random access occasion occupies 2 OFDM symbols, and there are 6 random access occasions in one slot, then for the IAB random access configuration, the IAB preamble format is configured as Format0 (occupying the entire slot), and then the respective IAB random access occasions are Slots 1, 4, 7, as shown in FIG. 3.

Figure 4:
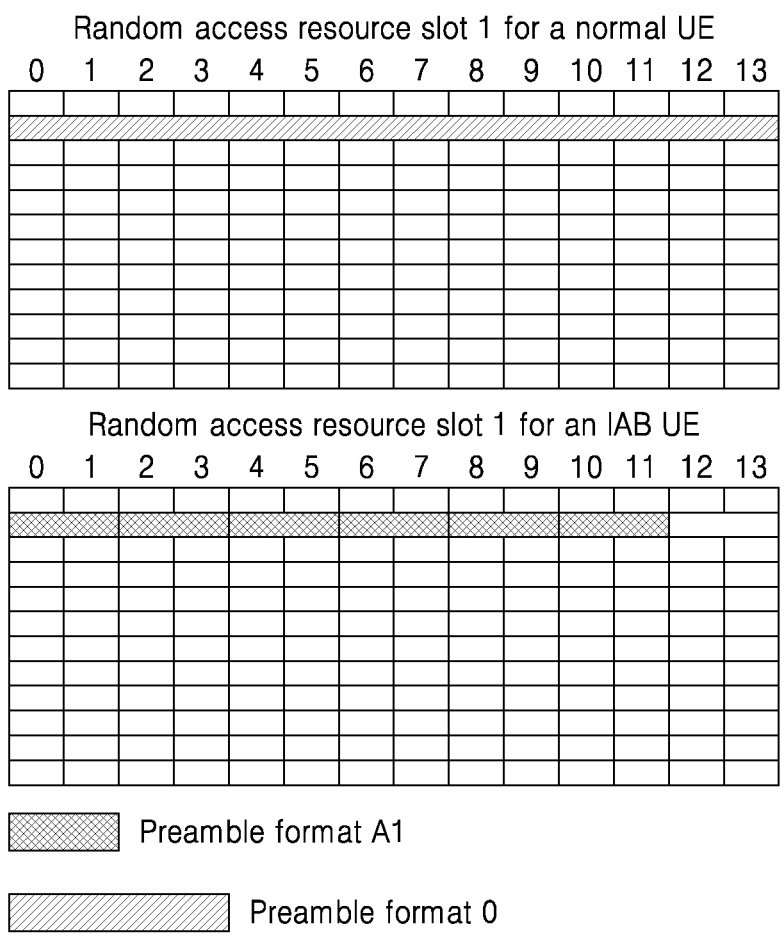
FIG. 4 illustrates an example in which an IAB UE employs a different short preamble format according to an embodiment of the disclosure.

FIG. 4 illustrates an example in which an IAB UE employs a different short preamble format according to an embodiment of the disclosure. If the random access preamble format indicated by the random access configuration index in the random access configuration information of the normal UE is a longer sequence format (such as, a preamble sequence with a length of 839), while the IAB random access preamble format is a short preamble format (such as, a preamble sequence with a length of 139), then for the random access resources for IAB, the IAB UE may reuse at least the time unit indices of the random access resources.

Moreover, the random access occasion start time unit index is determined according to the predefined start position and/or number (or the configured start position and/or number, or the start position and/or the number of the short preamble format by default). For example, the random access preamble format indicated by the random access configuration index in the random access configuration information of the normal UE is 0, the time unit indices of the random access resources are Slots 1, 4, 7 (such as, a random access configuration index 22), and one random access occasion occupies the duration of the entire slot, then for the IAB random access configuration, the IAB preamble format is configured as A1 (2 OFDM symbols are occupied by one random access occasion, there are 6 random access occasions in one slot, and the predefined start position is the 0-th OFDM symbol), then the respective IAB random access occasions are Slots 1, 4, 7, and the random access occasion in each slot is as shown in FIG. 4.

Figure 5:
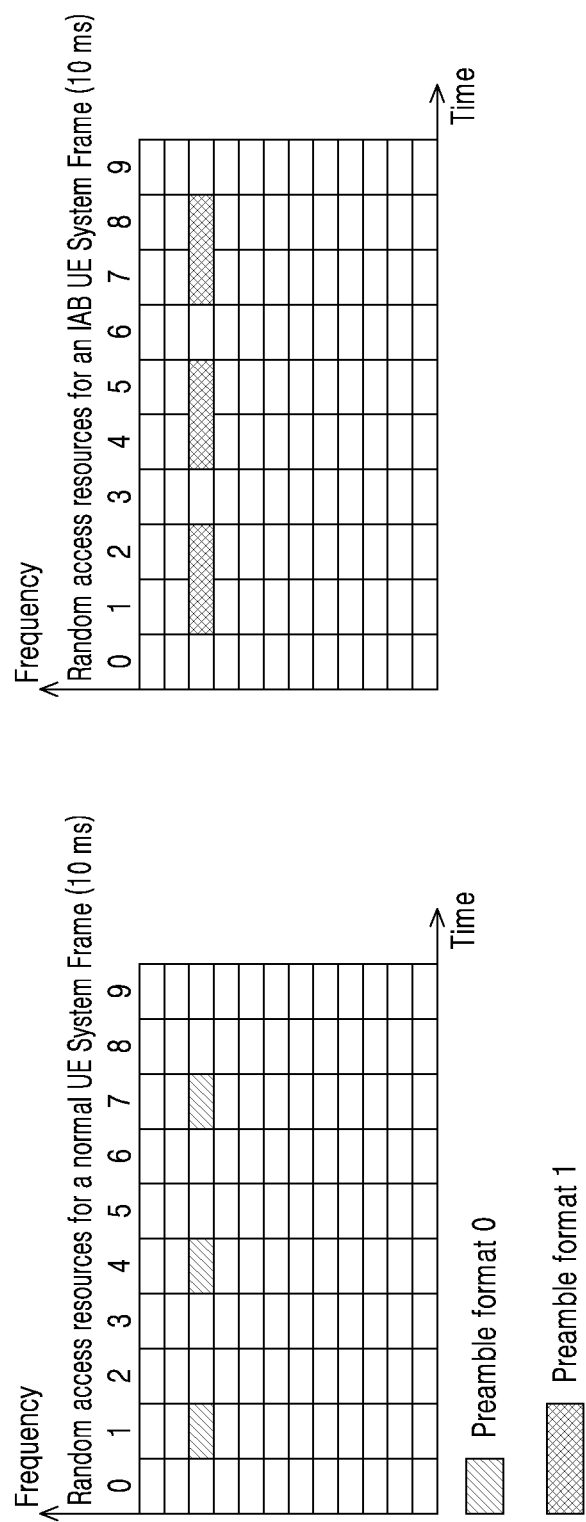
FIG. 5 illustrates another example in which an IAB UE employs a different longer preamble format according to an embodiment of the disclosure.

FIG. 5 illustrates another example in which an IAB UE employs a different longer preamble format according to an embodiment of the disclosure. If the random access preamble format indicated by the random access configuration index in the random access configuration information of the normal UE is a longer sequence format (such as, a preamble sequence with a length of 839), and the IAB random access preamble format is also a longer sequence format but is different from that of the normal UE, then for the random access resources for IAB, the IAB UE may reuse at least the time unit indices of the random access resources.

In this case, the random access occasion start time unit index for the IAB UE is determined according to the time unit indices of the random access resources for the normal UE. For example, if the random access preamble format indicated by the random access configuration index in the random access configuration information of the normal UE is 0, the time unit indices of the random access resources are Slots 1, 4, 7 (such as, a random access configuration index 22), and one random access occasion occupies the duration of the entire slot, then for the IAB random access configuration, the IAB preamble format is configured as Format 1 (one random access occasion occupies two slots), then the respective IAB random access occasions are two slots respectively taking Slots 1, 4, 7 as their start positions, as shown in FIG. 5.

In addition, it should be noted that if the random access occasions for the IAB UE determined according to the foregoing method overlap with each other, valid random access occasions may be determined according to at least one of the following rules: the random access occasions earlier in the overlapping random access occasions being valid, the random access occasions later in the overlapping random access occasions being valid, all the overlapping random access occasion being valid, and all the overlapping random access occasions being invalid.

Figure 6:
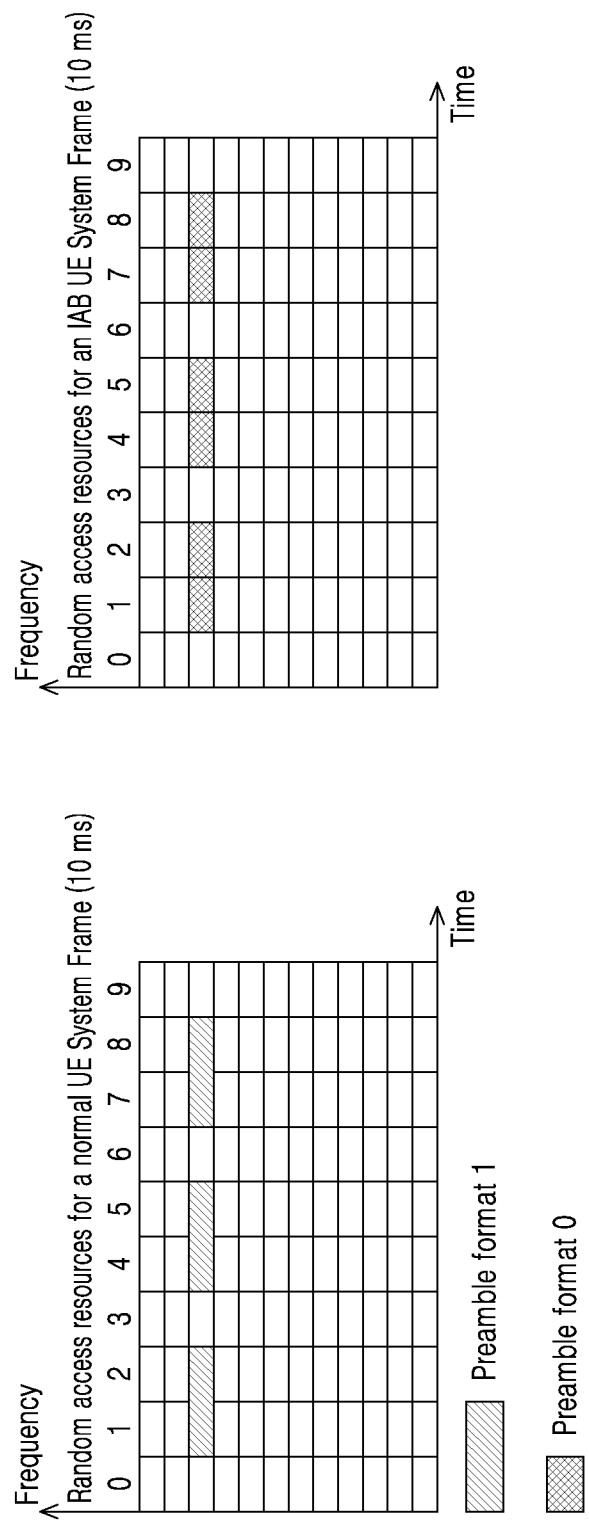
FIG. 6 illustrates yet another example in which an IAB UE employs a different longer preamble format according to an embodiment of the disclosure.

FIG. 6 illustrates yet another example in which an IAB UE employs a different longer preamble format according to an embodiment of the disclosure. If the duration occupied by the random access occasion for the IAB UE is shorter than that occupied by the random access occasion for the normal UE, for example, the duration occupied by the random access occasion for the normal UE N1=2 slots, and the duration occupied by the random access occasion for the IAB UE N2=1 slot; then the number or the start position of the random access occasions for the IAB UE is determined by rounding (which may be flooring or ceiling) the ratio of [N1/N2]. As an example, as shown in FIG. 6, if the random access resources for the normal UE are in Slots 1, 4, and 7, the random access resources for the IAB UE are in Slots 1, 2, 4, 5, 7, and 8.

Details regarding the transmission of the preamble according to embodiments of the disclosure will be described below. In an embodiment, a timing advance value TA_IAB_rach and a downlink signal (e.g., a SSB or CSI-RS) configuration information may also be provided to the IAB UE. According to the embodiment of the disclosure, the timing advance value TA_IAB_rach may be included in the random access configuration information of the IAB UE. The downlink signal configuration information may include at least one of: a downlink signal period, the number of downlink signals transmitted in a downlink signal period, indices of downlink signals transmitted in a downlink signal period, positions of time units in downlink signals transmitted in a downlink signal period and positions of frequency domain units in downlink signals transmitted in a downlink signal period.

The foregoing information may be received by the IAB UE to determine the configuration of the random access resources for IAB, and mapping information of a downlink signal to an RO may be obtained based on the configuration information. The mapping information may include at least one of: a mapping period of the downlink signal to the RO (for example, the number of random access configuration periods required to complete at least one mapping of the downlink signal to the RO); and a mapping pattern period of a downlink signal to an RO (for example, ensuring that the durations of the mapping of a downlink signal to an RO within two adjacent mapping pattern periods are exactly the same, such as the required number of mapping periods of a downlink signal to an RO, or the required number of random access configuration periods).

The UE may determine downlink signal indices for determining random access resources based on one or N (N>1) downlink signal indices configured for random access:
  if the UE obtains a downlink signal index for random access, it is determined to use the downlink signal index to determine the random access resources;
  if the UE obtains N downlink signal indices for random access, the UE may randomly select a downlink signal index from the N downlink signal indices with an equal probability, and determine the random access resources based on the selected downlink signal index; or the UE may select a downlink signal index with the largest reference signal received power (RSRP) from the N downlink signal indices for determining the random access resources.

The UE may determine the available random access occasions, that is, determine one or more random access occasions (PRACH occasions, ROs) that are currently available for the selected downlink signal, according to the mapping relationship between the downlink signal and the ROs (that is, determining the positions and the number of ROs corresponding to a certain downlink signal according to the configured indices of one or more ROs to which one downlink signal is mapped). In this case, with respect to all the configured ROs within one period, the UE sorts the ROs within one slot in a manner of frequency domain first and time domain next according to the indication of the random access configuration information, and then continues to sort the ROs within the next slot. The order of the indices of the ROs within the next period need to be reset (that is, re-sorting from 0). The period may be:
- a duration (for example, the number of OFDM symbols, the number of slots, etc.) for completely mapping all the CSI-RSs within a downlink signal period configured for the UE to corresponding ROs, which may also be referred to as a mapping circle of a downlink signal to ROs;
- a random access configuration period;
- a mapping period of a downlink signal to ROs;
- a mapping pattern period of a downlink signal to ROs.

Specifically, all the configured ROs within one period may be valid ROs determined based on a certain judging criteria, which may be determined by the UE based on the uplink and downlink configuration information and/or the configuration information of a downlink signal configured by the network device. For example, the UE may determine that
1. the random access occasions obtained from the random access configuration only on the part within an uplink and downlink configuration period that is indicated by the uplink and downlink configuration information as uplink are valid random access occasions; or
2. the random access occasions obtained from the random access configuration only on the part within an uplink and downlink configuration period that is indicated by the uplink and downlink configuration information as non-uplink are valid random access occasions; or
3. the random access occasions obtained from the random access configuration only on the part that is one or more time units after the part within an uplink and downlink configuration period that is indicated by the uplink and downlink configuration information as downlink are valid random access occasions; or
4. the random access occasions obtained from the random access configuration only on the part that is one or more time units after the part corresponding to the last downlink signal within an uplink and downlink configuration period that is indicated by the uplink and downlink configuration information as downlink signals are valid random access occasions.

Specifically, when a not used resource part (also referred to as a not used part, NUP) is indicated by the uplink and downlink configuration information (for example, Slot 4 may not be used), the UE may determine that
1. the random access occasions obtained from the random access configuration only on the part within an uplink and downlink configuration period that is indicated by the uplink and downlink configuration information as non-downlink and does not overlap with NUP are valid random access occasions; or
2. the random access occasions obtained from the random access configuration only on the part that is one or more time units after the part within an uplink and downlink configuration period that is indicated by the uplink and downlink configuration information as downlink and does not overlap with NUP are valid random access occasions; or
3. the random access occasions obtained from the random access configuration only on the part that is one or more time units after the part corresponding to the last downlink signal within an uplink and downlink configuration period that is indicated by the uplink and downlink configuration information as downlink signals and does not overlap with NUP are valid random access occasions.

Specifically, the sorting may be performed according to the minimum number of valid ROs in the period, that is, the number of valid ROs even if the valid ROs may be the least in a certain temporal period. As an example, even if the first 4 ROs in the second random access configuration period should be valid, the sorting may be performed on the 4 ROs obtained in the first random access configuration period.

The UE may determine the random access occasions available to itself according to the configured ROs indices and the order of available ROs obtained from the foregoing mapping relationship.

If the UE obtains, for one downlink signal, only a configuration of one RO index, the UE may determine the RO as the selected RO to perform the transmission of random access preambles;

if the UE obtains, for one downlink signal, the configuration of N (N>1) RO indices, the UE may select the RO with the minimum RO index value to perform the transmission of the random access preambles; or randomly select one RO from the N ROs with an equal probability to perform the transmission of the random access preambles; or select the first available RO from the N ROs to perform the transmission of the random access preambles, wherein the first available RO refers to the first available RO after the UE is ready to transmit the random preambles.

After the IAB UE determines the position of the latest available random access signal occasion, i.e., the start position of the RO is denoted as T_dl (the start position may also be denoted as the time when the downlink synchronization time is 0, that is, T_dl=0), the UE may transmit the determined random access preambles at the time of TA_IAB_rach before the T_dl. Specifically,
1. the UE transmits the random access preambles in advance by a timing advance value TA_IAB_rach only in one of the following cases:
   a) where the PRACH is transmitted in a primary cell (Pcell); or
   b) where the PRACH is transmitted in a primary secondary cell (Pscell); or
   c) where the PRACH is transmitted in a secondary network (Scell);
   and/or
2. the IAB UE transmits the random access preambles in advance by TA_IAB_rach only in one of the following random access triggering events:
   a) an event of a beam failure recovery request;
   b) an event where a random access is triggered by a downlink control channel;
   c) an event of a scheduling request;
   d) an event of initial access in the RRC_IDLE state;
   e) an event of RRC connection re-establishment;
   f) an event of cell handover;
   g) an event where in the RRC connected state, downlink data or uplink data arrives and a random access process is requested (when the uplink is in a non-synchronous mode);
   h) an event of positioning.

Here, the TA_IAB_rach may be:
1. a maximum timing advance value that may be indicated by a timing advance command;
2. a cell-specific timing advance value configured by the network device (e.g., a cell-specific timing advance value set by considering the coverage range of the cell and/or the inter-cell interference);

3. a timing advance value specific to one UE that is configured by the network device.

Then, the UE transmits the random access preambles in the configured preamble format on the current RO; and calculates the RA-RNTI, that will be used to search for random access feedback, based on the index of the time-frequency location of the RO on which the preambles are transmitted; and obtains, from the random access feedback, the timing advance value TA_rar indicated by the timing proposal command (for example, a 12-bit TA command or N high/low bits of a 12-bit TA command) of the network configuration, and determines a timing advance value TA_actual for its subsequent uplink transmission. The actual timing advance value TA_actual may be determined based on TA_actual=TA_IAB_rach+TA_rar. In this case, if TA_rar is configured as a negative number, it means that TA_actual is less than the configured TA_IAB_rach; if TA_rar is configured as a positive number, it means that TA_actual is greater than the configured TA_IAB_rach; if TA_rar is set to be zero, it means that TA_actual=TA_IAB_rach. The actual timing advance value TA_actual may also be determined based on TA_actual=TA_IAB_rach-TA_rar. In this case, if TA_rar is configured as a negative number, it means that TA_actual is greater than the configured TA_IAB_rach; if TA_rar is configured as a positive number, it means that TA_actual is less than the configured TA_IAB_rach; if TA_rar is set to be zero, it means that TA_actual=TA_IAB_rach.

Figure 7:
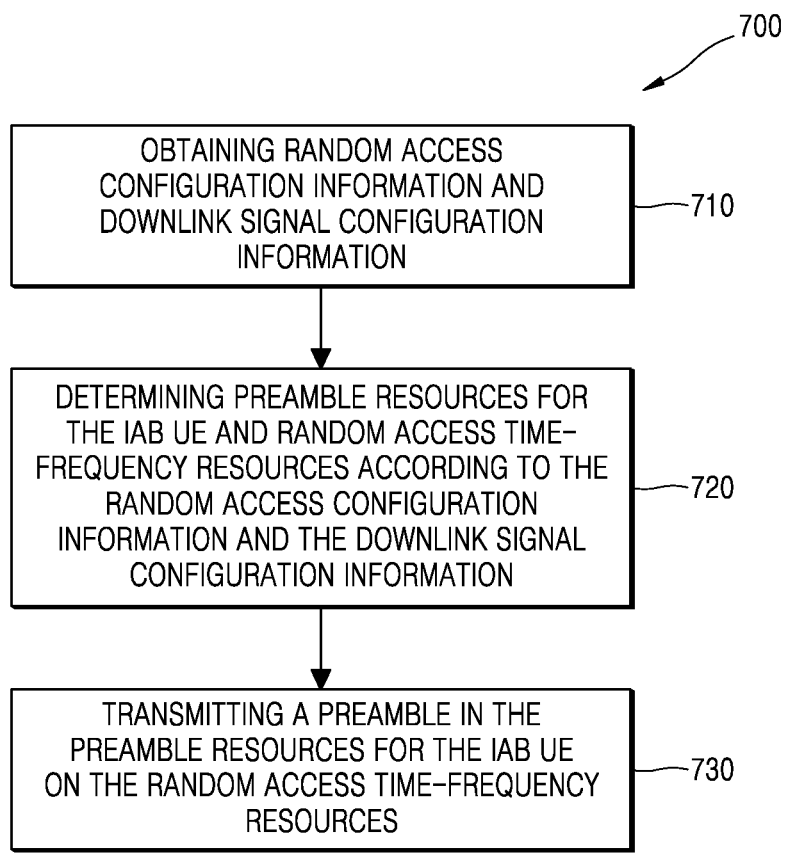
FIG. 7 illustrates a flowchart of a method for transmitting an uplink signals for a UE according to an embodiment of the disclosure.

FIG. 7 illustrates a flowchart of a method 700 for transmitting uplink signals for a UE according to an embodiment of the disclosure. The method 700 may include: a step 710 of obtaining random access configuration information, which includes the random access configuration information for a normal UE and the random access configuration information for an integrated access and backhaul (IAB) UE, and downlink signal configuration information; a step 720 of determining preamble resources for the IAB UE and the downlink signal configuration information of random access time-frequency resources according to the random access configuration information and the downlink signal configuration information; and a step 730 of transmitting the preamble in the preamble resources for the IAB UE on the said random access time-frequency resources.

Figure 8:
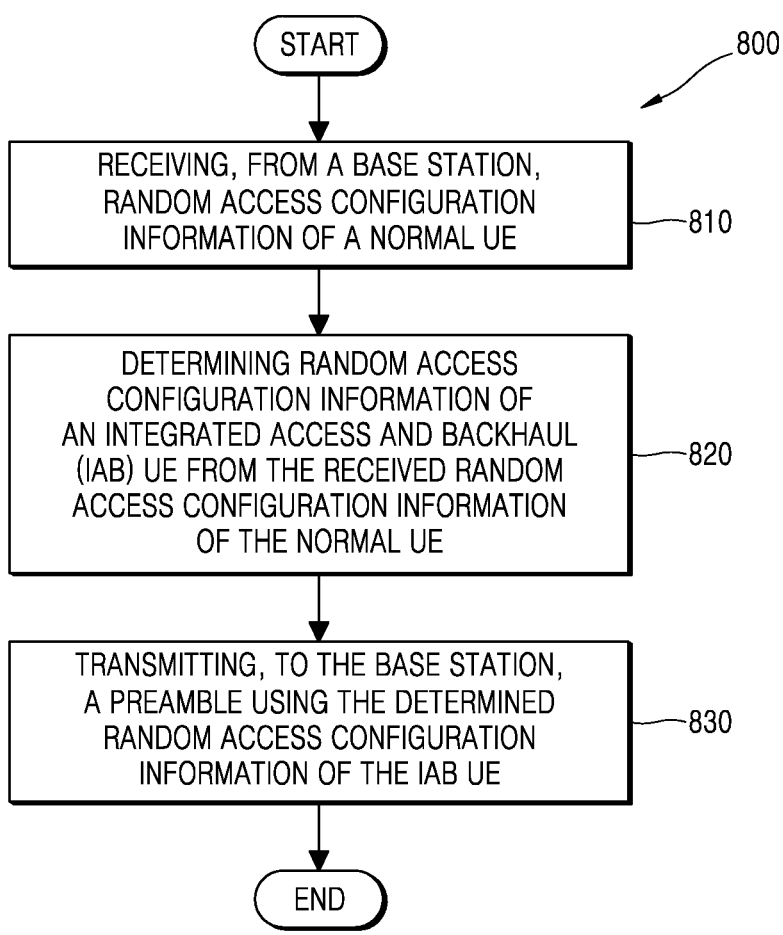
FIG. 8 illustrates a flowchart of a method for a user equipment (UE) in a wireless communication system according to an embodiment of the disclosure.

FIG. 8 illustrates a flowchart of a method 800 for a user equipment (UE) in a wireless communication system according to an embodiment of the disclosure.

The method 800 illustrated in the FIG. 8 may include a step 810 of receiving, from a base station, random access configuration information of a normal UE. The method 800 may include a step 820 of determining random access configuration information of an integrated Access and Backhaul (IAB) UE from the received random access configuration information of the normal UE based on information indicating relationship between the random access configuration information of the normal UE and the random access configuration information of the IAB UE. And, the method 800 may include a step 830 of transmitting, to the base station, a preamble using the determined random access configuration information of the IAB UE.

According to the embodiment of the disclosure, the information indicating relationship between the random access configuration information of the normal UE and the random access configuration information of the IAB UE may include at least one of a scaling factor associated with a periodicity of random access configuration of the IAB UE or an offset associated with random access occasion of the IAB UE.

According to the embodiment of the disclosure, the random access configuration information of the IAB UE comprises at least one of information for the periodicity of random access configuration of the IAB UE or information for the random access occasion of the IAB UE.

According to the embodiment of the disclosure, the determining of the random access configuration information of the IAB UE may include determining the periodicity of the random access configuration of the IAB UE by multiplying a periodicity of random access configuration of the normal UE by the scaling factor.

According to the embodiment of the disclosure, the determining of the random access configuration information of the IAB may include determining the random access occasion of the IAB UE by adding the offset to random access occasion of the normal UE.

According to the embodiment of the disclosure, the method may include receiving, from the base station, uplink and downlink configuration information, and determining random access occasion for transmission of a preamble based on the uplink and downlink configuration information.

According to the embodiment of the disclosure, the random access occasion is valid within a part indicated as an uplink by the uplink and downlink configuration information.

According to the embodiment of the disclosure, the determining of the random access occasion may include determining the random access occasion at one or more time units after a first part indicated as a downlink by the uplink and downlink configuration information and the one or more time units after a second part indicated as a downlink signal by the uplink and downlink configuration information.

According to the embodiment of the disclosure, the downlink signal comprises a synchronization signal block (SSB)

Figure 9:
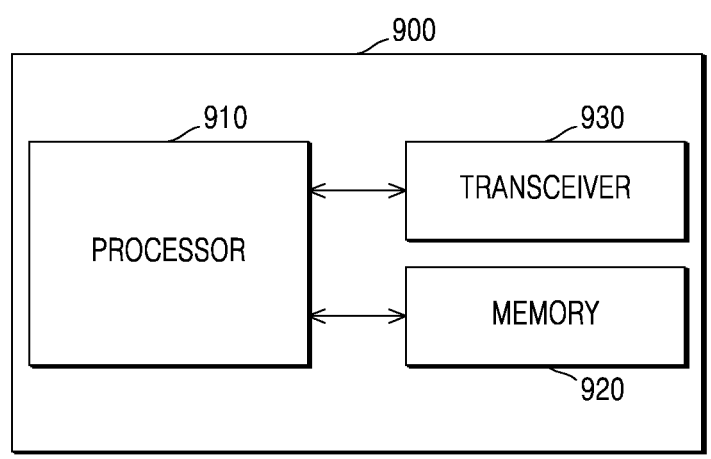
FIG. 9 illustrates a block diagram of a UE according to an embodiment of the disclosure.

Specifically, FIG. 9 illustrates a block diagram of the internal structure of a UE 900 according to an embodiment of the disclosure. As shown in FIG. 9, the UE 900 may include a processor 910, a transceiver 930, and memory 920. The memory 920 stores instructions that, when executed by the processor 910, cause the processor to perform the transmission method as described above with reference to FIGS. 1-8. However, components of the UE are not limited to the examples set forth above. For example, the UE may include more components or less components than the components set forth above. In addition, the processor 910, the transceiver 930, and the memory 920 may be implemented in the form of one chip.

The processor 910 may control a series of processes in which the UE may be operated according to the above-described embodiments of the disclosure. For example, according to the information indicating relationship between the random access configuration information of the normal UE and the random access configuration information of the IAB UE, the random access configuration information of the IAB UE is determined.

The transceiver 930 may transmit a signal to and receive a signal from a gNB. The signal set forth above may include control information and data. For this purpose, the transceiver 930 may include a radio frequency (RF) transmitter up-converting and amplifying a frequency of a transmitted signal, an RF receiver performing low-noise amplification and frequency down-conversion on a received signal, and the like. In addition, the transceiver 930 may receive a signal through a radio channel and output the signal to the processor 910, and may transmit, through the radio channel, a signal that is output from the processor 910.

The memory 920 may store at least one of information transmitted and received by the transceiver 930 or information generated by the processor 910. In addition, the memory 920 may store control information or data included in an acquired signal. The memory 920 may include a storage medium such as read-only memory (ROM), random access memory (RAM), a hard disk, compact disc ROM (CD-ROM), and a digital versatile disc (DVD), or a combination of storage media. Further, the memory 920 may include a plurality of memories.

According to another embodiment of the disclosure, a user equipment (UE) in a wireless communication system is provided, the UE includes a transceiver, and at least one processor configured to: receive, from a base station, random access configuration information of a normal UE, determine random access configuration information of an integrated Access and Backhaul (IAB) UE from the received random access configuration information of the normal UE based on information indicating relationship between the random access configuration information of the normal UE and the random access configuration information of the IAB UE, and transmit, to the base station, a preamble using the determined random access configuration information of the IAB UE.

In the another embodiment of the disclosure, the information indicating relationship between the random access configuration information of the normal UE and the random access configuration information of the IAB UE may includes at least one of a scaling factor associated with a periodicity of random access configuration of the IAB UE or an offset associated with random access occasion of the IAB UE.

In the another embodiment of the disclosure, the random access configuration information of the IAB UE may include at least one of information for the periodicity of random access configuration of the IAB UE or information for the random access occasion of the IAB UE.

In the another embodiment of the disclosure, the at least one processor is further configured to determine the periodicity of the random access configuration of the IAB UE by multiplying a periodicity of random access configuration of the normal UE by the scaling factor.

In the another embodiment of the disclosure, the at least one processor is further configured to determine the random access occasion of the IAB UE by adding the offset to random access occasion of the normal UE.

In the another embodiment of the disclosure, the at least one processor is further configured to receive, from the base station, uplink and downlink configuration information, and determine random access occasion for transmission of a preamble based on the uplink and downlink configuration information.

In the another embodiment of the disclosure, the random access occasion is valid within a part indicated as an uplink by the uplink and downlink configuration information.

In the another embodiment of the disclosure, the at least one processor is further configured to determine the random access occasion at one or more time units after a first part indicated as a downlink by the uplink and downlink configuration information and the one or more time units after a second part indicated as a downlink signal by the uplink and downlink configuration information.

In the another embodiment of the disclosure, the downlink signal comprises a synchronization signal block (SSB).

As an example, the processor may be configured to receive/read configuration information from a network device (for example, a base station) to obtain random access configuration information, downlink signal configuration information, and a timing advance value TA; and obtain the mapping relationship between a synchronization signal block and a random access occasion, and select a synchronization block. Corresponding available random access occasions may be obtained according to the selected synchronization signal block and the mapping relationship between the synchronization signal block and the random access occasion. The preamble signal may also be transmitted to the network device at the time that is TA before the first available random access occasion. In addition, the random access feedback (in which another timing advance value may be included) may also be received by the network device, so as to update the timing advance value TA for subsequent random access. For example, the timing advance value TA may be updated with the value obtained by adding the timing advance value TA and the other timing advance value.

The present embodiment may also provide a network device (not shown) for signal transmission/reception. The network device may include a memory and a processor. The memory may store a computer executable instruction, that when executed by the processor, may cause the process to perform at least one of the methods corresponding to the above embodiments of the disclosure. Specifically, for example, the processor may cause the network device to transmit configuration information to a UE; detect a possible random access preamble signal on the configured random access occasion; or detect, by the network device, the uplink signal transmitted by the UE on the configured uplink transmission resources. The configuration information may include at least one of: random access configuration information; downlink signal configuration information, such as synchronization signal block configuration information; and a timing advance value TA.

The random access configuration information may include at least one of: a random access configuration period; a time unit index of a random access occasion; a frequency domain unit index of a random access occasion; the number of random access occasions; a random access preamble format; the number, a root sequence index, a cyclic shift value of random access preambles; and the number of SSBs that may be mapped on one random access occasion.

The synchronization signal block configuration information may include at least one of: a SSB period; the number of SSBs transmitted within one SSB period; the positions of time unit of SSBs transmitted within one SSB period; the positions of frequency domain units of SSBs transmitted within one SSB period.

The timing advance value TA may be one of: a maximum timing advance value that the timing advance command may indicate; a cell-specific timing advance value configured by a network device; and a timing advance value specific to a UE configured by the network device.

The disclosure also provides a computer readable medium having stored thereon computer executable instructions that, when executed, may implement any of the methods described in the embodiments of the disclosure. For example, obtaining random access configuration information and downlink signal configuration information, and the random access configuration information includes random access configuration information for a normal UE and random access configuration information for an integrated access and backhaul (IAB) UE; determining preamble resources for the IAB UE and the downlink signal configuration information of random access time-frequency resources according to the random access configuration information and the downlink signal configuration information; and transmitting a preamble in the preamble resources for the IAB UE on the random access time-frequency resources.

Herein, the UE may refer to any terminal having radio communication capabilities, including but not limited to a mobile phone, a cellular phone, a smart phone or a personal digital assistant (PDA), a portable computer, an image capturing device such as a digital camera, a gaming device, a music storage and playback device, as well as any portable unit or terminal having radio communication capabilities, or an Internet facility that allows wireless Internet access and browsing etc. The transceiver as used herein may be any type of transceiver being suitable for the technical context herein, and may also be implemented using any suitable data storage scheme, including but not limited to a semiconductor-based memory device, a magnetic memory device and system, an optical memory device and system, a fixed memory and a removable memory. The processor as used herein may be any type of processor being suitable for the technical context herein, and include but not limited to one or more of: a general-purpose computer, a dedicated computer, a microprocessor, a digital signal processor (DSP), and a processor based on an architecture of a multi-core processor.

The foregoing is merely illustrative of the preferred embodiments of the disclosure, and is not intended to limit the disclosure. Any modifications, equivalents, improvements, etc., which are made within the spirit and principle of the disclosure, should be included in the scope of the disclosure.

It is to be appreciated by those skilled in the art that any of the devices involving the performance of one or more of the operations described herein is included in the scope of the disclosure. These devices may be specially designed and manufactured for desired purposes, or may also include a known device(s) in a general purpose computer. These devices have computer programs stored therein that are selectively activated or reconfigured. Such computer programs may be stored in a device (e.g., computer) readable medium or in any type of medium suitable for storing electronic instructions and coupled to a bus, respectively. The computer readable medium may include but is not limited to any type of disk (including a floppy disk, a hard disk, an optical disk, a CD-ROM, and a magnetic optical disk), Read-Only Memory (ROM), Random Access Memory (RAM), Erasable Programmable Read-Only Memory (EPROM), Electrically Erasable Programmable Read-Only Memory (EEPROM), flash memory, magnetic card or optical card. That is to say, the readable medium may include any medium that stores or transmits information in a device (e.g., computer) readable manner.

It is to be appreciated by those skilled in the art that each of the blocks in the structure diagrams and/or block diagrams and/or flow diagrams and combinations of the blocks in the structure diagrams and/or block diagrams and/or flow diagrams may be implemented by the computer program instructions. It is to be appreciated by those skilled in the art that such computer program instructions may be provided to a general purpose computer, a dedicated computer, or other programmable processor that may execute data processing methods, such that the scheme specified by one or more blocks in the structure diagrams and/or block diagrams and/or flow diagrams disclosed in the disclosure may be executed by the computer or the other programmable processor that may execute data processing methods.

It is to be understood by those skilled in the art that the steps, means, and schemes in various operations, methods, and processes that have been discussed in the disclosure may be replaced, modified, combined, or deleted. Further, other steps, means, and schemes in various operations, methods, and processes that have been discussed in the disclosure may also be replaced, modified, rearranged, divided, combined, or deleted. Still further, the steps, means, and schemes in various operations, methods, and processes that have been discussed in the disclosure may also be replaced, modified, rearranged, divided, or combined with the steps, means, and schemes in the prior art.

The foregoing is merely a part of the implementations of the disclosure, and it should be noted that various improvements and polishing may be made by those skilled in the art without departing from the principles of the disclosure. And the improvements and polishing should be considered as being within the scope of the disclosure.

Although the present disclosure has been described with various embodiments, various changes and modifications may be suggested to one skilled in the art. It is intended that the present disclosure encompass such changes and modifications as fall within the scope of the appended claims.

What is claimed is:

1. A method performed by an Integrated Access and Backhaul (IAB) user equipment (UE) in a wireless communication system, the method comprising:
    receiving, from a next generation Node B (gNB), random access channel (RACH) configuration information for a UE, the RACH configuration information indicating a physical random access channel (PRACH) configuration period of the UE and a time-frequency resource for a random access occasion (RO) of the UE within the PRACH configuration period;
    receiving, from the gNB, RACH configuration information for the IAB UE, the RACH configuration information for the IAB UE comprising a scaling factor associated with a PRACH configuration period of the IAB UE and a time offset associated with a time-frequency resource for an RO of the IAB UE;
    determining the PRACH configuration period of the IAB UE based on the PRACH configuration period of the UE and the scaling factor;
    determining the time-frequency resource for the RO of the IAB UE based on the time-frequency resource for the RO of the UE, the time offset and the determined PRACH configuration period of the IAB UE; and
    transmitting, to the gNB, a preamble for random access using the determined PRACH configuration period of the IAB UE and the determined time-frequency resource for the RO of the IAB UE.

2. The method of claim 1, wherein the determining of the PRACH configuration period of the IAB UE comprises:
    determining the PRACH configuration period of the IAB UE by multiplying the PRACH configuration period of the UE by the scaling factor.

3. The method of claim 2, wherein the determining of the time-frequency resource for the RO of the IAB UE comprises:
    determining the time-frequency resource for the RO of the IAB UE within the determined PRACH configuration period of the IAB UE by adding the time offset to the time-frequency resource for the RO of the UE.

4. The method of claim 3, wherein the time offset comprises at least one of a frame level offset, a subframe level offset or a slot level offset.

5. The method of claim 1, further comprising:
determining the PRACH configuration period of the IAB UE as the PRACH configuration period of the UE and the time-frequency resource for the RO of the IAB UE as the time-frequency resource for RO of the UE based on an indication by the RACH configuration information for the IAB UE.

6. An Integrated Access and Backhaul (IAB) user equipment (UE) in a wireless communication system, the IAB UE comprising:
a transceiver; and
at least one processor configured to:
receive, via the transceiver from a next generation Node B (gNB), random access channel (RACH) configuration information for a UE, the RACH configuration information indicating a physical random access channel (PRACH) configuration period of the UE and a time-frequency resource for a random access occasion (RO) of the UE within the PRACH configuration period,
receive, via the transceiver from the gNB, RACH configuration information for the IAB UE, the RACH configuration information for the IAB UE comprising a scaling factor associated with a PRACH configuration period of the IAB UE and a time offset associated with a time-frequency resource for an RO of the IAB UE,
determine the PRACH configuration period of the IAB UE based on the PRACH configuration period of the UE and the scaling factor,
determine the time-frequency resource for the RO of the IAB UE based on the time-frequency resource for the RO of the UE, the time offset and the determined PRACH configuration period of the IAB UE, and
transmit, via the transceiver to the gNB, a preamble for random access using the determined PRACH configuration period of the IAB UE and the determined time-frequency resource for the RO of the IAB UE.

7. The IAB UE of claim 6, wherein the at least one processor is further configured to determine the PRACH configuration period of the IAB UE by multiplying the PRACH configuration period of the UE by the scaling factor.

8. The IAB UE of claim 7, wherein the at least one processor is further configured to determine the time-frequency resource for the RO of the IAB UE within determined PRACH configuration period of the IAB UE by adding the time offset to the time-frequency resource for the RO of the UE.

9. The IAB UE of claim 8, wherein the time offset comprises at least one of a frame level offset, a subframe level offset or a slot level offset.

10. The IAB UE of claim 6, wherein the at least one processor is further configured to determine the PRACH configuration period of the IAB UE as the PRACH configuration period of the UE and the time-frequency resource for the RO of the IAB UE as the time-frequency resource for the RO of the UE based on an indication by the RACH configuration information for the IAB UE.

* * * * *